(12) United States Patent
Feng et al.

(10) Patent No.: US 6,810,168 B1
(45) Date of Patent: Oct. 26, 2004

(54) TUNABLE ADD/DROP NODE

(75) Inventors: Dazeng Feng, Arcadia, CA (US);
Wenhua Lin, Pasadena, CA (US);
Xiaoming Yin, Pasadena, CA (US)

(73) Assignee: Kotura, Inc., Monterey Park, CA (US)

( * ) Notice: Subject to any disclaimer, the term of this patent is extended or adjusted under 35 U.S.C. 154(b) by 70 days.

(21) Appl. No.: 10/158,399

(22) Filed: May 30, 2002

(51) Int. Cl.[7] .............................. G02B 6/28; G02B 6/34
(52) U.S. Cl. ........................... 385/24; 385/15; 385/27; 385/31; 385/37; 385/39; 398/83; 398/84; 398/85
(58) Field of Search ........................... 385/15, 24, 27, 385/31, 37, 39; 398/83–85

(56) References Cited

U.S. PATENT DOCUMENTS

| | | | |
|---|---|---|---|
| 4,618,210 A | 10/1986 | Kondo | 350/96.14 |
| 4,747,654 A | 5/1988 | Yi-Yan | 350/96.19 |
| 4,813,757 A | 3/1989 | Sakano et al. | 350/96.14 |
| 4,846,542 A | 7/1989 | Okayama et al. | 350/96.18 |
| 5,002,350 A | 3/1991 | Dragone | 350/96.15 |
| 5,013,113 A | 5/1991 | Soref | 350/96.14 |
| 5,039,993 A | 8/1991 | Dragone | 343/776 |
| 5,243,672 A | 9/1993 | Dragone | 385/46 |
| 5,412,744 A | 5/1995 | Dragone | 385/24 |
| 5,450,511 A | 9/1995 | Dragone | 385/37 |
| 5,467,418 A | 11/1995 | Dragone | 385/37 |
| 5,488,500 A * | 1/1996 | Glance | 398/85 |
| 5,542,010 A | 7/1996 | Glance et al. | 385/14 |
| 5,581,643 A | 12/1996 | Wu | 385/17 |
| 5,677,786 A | 10/1997 | Meli | 359/341 |
| 5,706,377 A | 1/1998 | Li | 385/37 |
| 5,712,932 A | 1/1998 | Alexander et al. | 385/24 |
| 5,721,796 A | 2/1998 | de Barros et al. | 385/27 |
| 5,841,931 A | 11/1998 | Foresi et al. | 385/131 |
| 5,915,051 A | 6/1999 | Damask et al. | 385/16 |
| 5,938,811 A | 8/1999 | Greene | 65/385 |
| 5,974,207 A * | 10/1999 | Aksyuk et al. | 385/24 |
| 5,991,477 A | 11/1999 | Ishikawa et al. | 385/24 |
| 6,021,242 A | 2/2000 | Harumoto et al. | 385/37 |
| 6,101,012 A | 8/2000 | Danagher et al. | 398/1 |
| 6,108,478 A | 8/2000 | Harpin et al. | 385/129 |
| 6,118,909 A | 9/2000 | Chen et al. | 385/15 |
| 6,122,418 A | 9/2000 | Ellis | 385/27 |
| 6,229,827 B1 | 5/2001 | Fernald et al. | 372/20 |
| 6,256,428 B1 * | 7/2001 | Norwood et al. | 385/17 |

(List continued on next page.)

FOREIGN PATENT DOCUMENTS

| | | | |
|---|---|---|---|
| EP | 0647861 A1 | 4/1995 | G02B/6/12 |
| EP | 098592 A2 | 3/2000 | G02B/6/293 |
| JP | 63-197923 | 8/1988 | G02F/1/31 |
| JP | 2-179621 | 7/1990 | G02F/1/313 |
| JP | 6-186598 | 7/1994 | G02F/1/313 |
| WO | WO 94/07178 | 3/1994 | G02F/1/313 |

OTHER PUBLICATIONS

Abe, et al., *Optical Path Length Trimming Technnique using Thin Film Heaters for Slice–Based Waveguides on Sl*, Electronic Letters, Sep. 12, 1996, vol. 32–No. 19, pp. 1818–1820.

(List continued on next page.)

*Primary Examiner*—Brian Healy
*Assistant Examiner*—Daniel Petkovsek
(74) *Attorney, Agent, or Firm*—Law Offices of Travis L. Dodd, P.C.

(57) ABSTRACT

An add/drop node is disclosed. The add/drop node includes a first filter configured to receive a light beam having a plurality of channels. The first filter is also configured to direct channels having wavelengths falling within a plurality of first wavelength bands to a transition waveguide. The add/drop node also includes a second filter configured to receive the channels directed to the transition waveguide. The second filter is configured to direct channels having wavelengths falling within a plurality of second wavelength bands to a drop waveguide. The first filter and/or the second filter can be tunable.

17 Claims, 5 Drawing Sheets

U.S. PATENT DOCUMENTS

| | | | | |
|---|---|---|---|---|
| 6,272,270 B1 | 8/2001 | Okayama | | 385/46 |
| 6,337,933 B1 | 1/2002 | Brenner | | 385/15 |
| 6,337,937 B1 | 1/2002 | Takushima et al. | | 385/28 |
| 6,348,984 B1 * | 2/2002 | Mizrahi | | 398/79 |
| 6,415,082 B1 | 7/2002 | Wach | | 385/39 |
| 6,466,341 B1 | 10/2002 | Lumish et al. | | 398/82 |
| 6,486,984 B1 | 11/2002 | Baney et al. | | 398/212 |
| 6,542,666 B2 | 4/2003 | Tsuda et al. | | 385/37 |
| 6,546,167 B1 | 4/2003 | Chen et al. | | 385/24 |
| 6,549,328 B2 | 4/2003 | Aoki et al. | | 359/308 |
| 6,594,410 B2 | 7/2003 | Kersey et al. | | 385/15 |
| 6,687,463 B1 * | 2/2004 | Hutchison et al. | | 398/83 |
| 2002/0146226 A1 * | 10/2002 | Davis et al. | | 385/126 |
| 2002/0159141 A1 | 10/2002 | Choa | | 359/349 |
| 2002/0186928 A1 | 12/2002 | Curtis | | 385/37 |
| 2003/0123774 A1 * | 7/2003 | Nakazawa et al. | | 385/7 |
| 2003/0202742 A1 * | 10/2003 | Kato et al. | | 385/24 |

OTHER PUBLICATIONS

Albert, J. *Planar Fresnel Lens Photoimprinted in a Germainium–Doped Silica Optical Waveguide,* Optics Letters, May 15, 1995, vol. n20–No. 10, pp 1136–1138.

Aman, M.C., *Calculation of Metal–Clad Ridge–Waveguide (MCRW) Laser Modes by Mode Coupling Technique, Journal of Lightwave Technology,* vol LT–4, No. 6, Jun. 1986, p. 689–693.

Amann, M.C. et al, *Calculation Of The Effective Refractive–Index Step For The Metal–Cladded–Ridge–Waveguide Laser,* Applied Optics, vol. 20, No.8, Apr. 15 1981, pp. 1483–1486.

Baba, S. et al., *A Novel Integrated–Twin–Guide (ITG) Optical Switch with a Built–in TIR Region;* IEEE Photonics Technology Letters: vol. 4, No. 5, May 1992, pp. 486–488.

Benson, T.M., *Etched–Wall Bent–Guide Structure for Integrated Optics in the III–V Semiconductors;* Journal of Lightwave Technology, vol. LT–2, No.1, Feb. 1984; pp. 31–34.

Berry, G.M. et al., *Analysis Of Multiplayer Semiconductor Rib Waveguides With High Refractive Index Substrates,* Electronics Letters; vol. 29, No.22; Oct. 28, 1993, pp. 1941–1942.

Betty, I. et al., *A Robust, Low–Crosstalk, InGaAsP/InP Total–Internal–Reflection Switch for Optical Cross–Connect Application.*

Burke, S.V., *Spectral Index Method Applied to Coupled Rib Waveguides;* Electronics Letters, vol. 25, No.9, Apr. 27, 1989, pp. 605–606.

Burns, W.K. et al., *Mode Conversion in Planar–Dielectric Separating Waveguides;* IEEE Journal of Quantum Electronics, vol. QE–11, No.1, Jan. 1975; pp. 32–39.

Cai, Y.et al., *A Novel Three–Guide Optical Coupler Using a Taper–Formed Waveguide;* J. Appl. Phys 69(5), Mar. 1991; pp. 2810–2814.

Cavailles, J.A. et al., *First Digital Optical Switch Based on InP/GaInAsP Double Heterostructure Waveguides;* Electronics Letters, vol. 27, No.9, Apr. 25, 1991, pp. 699–700.

Chen, R.T. et al., *Design and Manufacturing of WDM Devices;* Proceedings of SPIE vol. 3234.

Clemens, et al., *Wavelength–Adaptable Optical Phased Array in $SiO_2$—Si,* Photonics Technology Letters, Oct. 1995, vol. 7–No. 10, 1040–1041.

Dagli, N. et al., *Analysis of Rib Dielectric Waveguides;* IEEE Journal of Quantum Electronics, vol. QE–21, No.4, Apr. 1985, pp. 315–321.

Dagli, N. et al., *Theoretical and Experimental Study of the Analysis and Modeling of Integrated Optical Components;* IEEE Journal of Quantum electronics, vol. 24, No. 11, Nov. 1988; pp. 2215–2226.

Deri, R.J., et al., *Low–Loss GaAs/AlGaAs Waveguide Phase Modulator Using A W–Shaped Index Profile;* Sep. 6, 1988.

Deri, R.J., et al., *Low–Loss Multiple Quantum Well Gain As/InP Optical Waveguides;* Feb. 21, 1989.

Devaux, F. et al., *20Gbit/s Operation of a High–Efficiency InGaAsP/InGaAsP MQW Electroabsorption Modulator With 1.2–V Drive Voltage;* IEEE Photonics Technology Letters, vol. 5, No. 11, Nov. 1993, pp. 1288–1290.

Doerr, C.R. et al., *Chirping Of The Waveguide Grating Router for Free–Spectral–Range Mode Selection In The Multifrequency Laser,* IEEE Photonics Technology Letters, Apr. 1996, vol. 8–No. 4, pp. 500–502.

Doerr, C.R. et al., *Chrometic Focal lane Displacement in the Parabolic Chirped Waveguide Grating Router,* May 1997, vol. 9–No. 5, pp. 625–627.

Dragone, c. *Singlemode Optical Switches Based on SOI Waveguides with Large Cross–Section.* Electronics Letters, Mar. 3, 1994, vol. 30 No. 5, pp. 406–408.

Fischer, et al., *Singlemode Optical Switches Based on SOI Waveguides with Large Cross–Section,* Electronics Letters, Mar. 3, 1994, vol. 30 No. 5, pp. 406–408.

Fischer, K. et al, *Sensor Application Of SiON Integrated Optical Waveguides On Silicon:* Elevier Sequgia; pp. 209–213.

Fish, G. et al., *Monolithic InP Optical Crossconnects: 4×4 and Beyond,* JWB2–1, pp. 19–21.

Furuta, H. et al, *Novel Optical Waveguide For Integrated Optics,* Applied Optics, vol. 13, No. 2, Feb. 1974, pp. 322–326.

Gini, E. et al., *Low Loss Self–Aligned Optical Waveguide Corner Mirrors in InGaAsP/InP,* We P2.22.

Goel, K. et al *Design Considerations for Low Switching Voltage Crossing Channel Switches;* Journal of Lightware Technology, vol. 6, No.6, Jun. 1968; pp. 881–886.

Granestrand, P. et al., *Integrated Optics 4×4 Switch Matrix with Digital Optical Switches;* Electronics Letters, vol. 26, No. 1, Jan. 4, 1990; pp. 4–5.

Himeno, A. et al., *Loss Measurement and Analysis of High–Silica Reflection Bending Optical Waveguides,* Journal of Lightwave Technology, Jan. 1988, vol. 6–No. 1, 41–48.

Hsu, K.Y. et al., *Photonics devices and Modules, www.cc.n-clu.edu.tw/–ctr/lee mti/research topic/photonic devices modules.htm,* pp. 1–3.

Huang, T.C. et al., *Depletion Edge Translation Waveguide Crossing Optical Switch;* IEEE Photonics Technology Letters; vol. 1, No.7, Jul. 1989, pp. 168–170.

Hutcheson, L.D. et al., *Comparison of Bending Losses in Integrated Optical Circuits;* Optics Letters, vol. 5, No.6, Jun. 1980, pp. 360–362.

Inoue, H. et al, *Low Loss GaAs Optical Waveguides,* Journal of Lightwave Technology, vol. LT–3, No.6, Dec. 1985; pp. 204–209.

Irace, A. et al., *Fast Silicon–on–Silicon Optoelectronic Router Based on a BMFET Device,* Journal of Selected Topics in Quantum Electronics, Jan./Feb. 2000, vol. 6–No. 1, pp. 14–18.

Ito, F. et al., *Carrier–Injection–Type Optical Switch In GaAs With A 1.06–1.55 μm Wavelength Range;* Appl Physics Letters, 54(2) Jan. 9, 1989; pp. 134–136.

Jackman, N. et al., *Optical Cross Connects for Optical Networking;* Bell Labs Technical Journal, Jan.–Mar. 1999; pp. 262–281.

Johnston, I.R., et al., *Silicon–Based Fabrication Process For Production Of Optical Waveguides;* IEE Proc–Optoelectron., vol. 143, No.1, Feb. 1996, pp. 37–40.

Kaenko, A. et al., *Athermal Silica–based Arrayed–waveguide Grating (AWG) Multiplexers with New Low Loss Groove Design;* TuO1–1, pp. 204–206.

Kasahara, R. et al., *Low–Power Consumption Silica–Based 2×2 Thermooptic Switch Using Trenched Silicon Substrate,* IEEE Photonics Technology Letters, vol. 11, No. 9, Sep. 1999, pp. 1132–1134.

Khan, M.N. et al., *Fabrication–Tolerant, Low–Loss, and High–Speed Digital Optical Switches in InGaAsP/InP Quantum Wells;* Proc $21^{st}$ Eur.Conf.on Opt. Comm. (ECOC '95–Brussels), pp. 103–106.

Khan, M.N. et al., *High–Speed Operation of Quantum Well Electron Transfer Digital Optical Switches*; pp. 102–102c.

Kirihara, T. et al., *Lossless and Low Crosstalk 4×4 Optical Switch Array; Electronics And Communications In Japan,* Part 2, vol. 77, No. 11, 1994, pp. 73–81.

Kirihara, T. et al., *Lossless and Low–Crosstalk Characteristics in an InP–Based 2×2 Optical Switch,* IEEE Photonics Technology Letters, vol. 5, No. 9 Sep. 1993, pp. 1059–1061.

Kokubun, Y. et al., *Athermal Waveguides for Temperature–Independent Lightwave Devices,* Nov. 1993, 1297–1298, vol. 5–No. 11, IEEE Photonics Technology Letters.

Kokubun, Y. et al., *Temperature–Independent Narrowband Optical Filter at 1.3 μm Wavelength by an Athermal Waveguide,* Oct. 10, 1996, vol. 32–No. 21, Electronics Letters.

Kokubun, Y. et al., *Temperature–Independent Optical Filter at 1.55 μm Waveguide Using a Silica–Based Athermal Waveguide,* Feb. 19, 1998, vol. 34–No. 4, Electronics Letters.

Kokubun, Y. et al., *Three–Dimensional Athermal Waveguides for Temperature Independent Lightwave Devices,* Jul. 21, 1994, vol. 30–No. 15, Electronics Letters.

Kostrzewa, C. et al., *Tunable Polymer Optical Add/Drop Filter for Multiwavelength Networks,* Photonics Technology Letters, Nov. 1997, vol. 9–No. 11, 1487–1489.

Laakman, K. D. et al., *Waveguides: Characteristic Modes Of Hollow Rectangular Dielectric Waveguides;* Applied Optics, vol. 15, No. 5, May 1976; pp. 1334–1340.

Lee, T.P. et al., $Al_{1-x}As$ *Double–Heterostructure Rib–Wavelength Injection Laser,* IEEE Journal of Quantum Electronics; vol. QE–11, No.7, Jul. 1975; pp. 432–435.

Liu, Y.L. et al., *Silicon 1×2 Digital Optical Switch Using Plasma Dispersion;* Electronics Letters, vol. 30, No.2, Jan. 20, 1994; pp. 130–131.

Mak, G. et al., *High–Speed Bulk InGaAsP–InP Electroabsorption Modulators with Bandwidth in Excess of 20 GHz,* IEEE Photonics Technology Letter, vol. 2, No.10, Oct. 1990, pp. 730–733.

Marcatili, E., *Improved Coupled–Mode Equations for Dielectric Guides;* IEEE Journal of Quantum Electronics, vol. QE–22, No.6, Jun. 1986; pp. 988–993.

Marcatili, E.A.J., *Bends in Optical Dielectric Guides;* The Bell System Technical Journal, Sep. 1969; pp. 2103–2132.

Marcatili, E.A.J., *Dielectric Rectangular Waveguide and Directional Coupler for Integrated Optics,* The Bell System Technical Journal, Sep. 1969 pp. 2071–2101.

Marcatili, E.A.J., *Slab–Coupled Waveguides;* The Bell System Technical Journal, Apr. 1974; American Telephone & Telegraph Company, vol. 53, No.4, Apr. 1974.

Mirza, A.R. et al, *Silicon Wafer Bonding for MEMS Manufacturing,* Solid State Technology, Aug. 1999, pp. 73–78.

Moerman, I. et al., *A Review on Fabrication Technologies for the Monolithic Integration of Tapers with III–V Semiconductor Devices;* IEEE Journal of Selected Topics in Quantum electronics, vol. 3, No.6, Dec. 1997, pp. 1308–1320.

Muller, G. et al., *First Low Loss InP/InGaAsP Optical Switch with Integrated Mode Transformers;* ThC12.10; pp. 37–40.

Nayyer, J. et al., *Analysis of Reflection–Type Optical Switches with Intersecting Waveguides,* Journal of Lightwave Technology, vol. 6, No.6, Jun. 1988; pp. 1146–1152.

Negami, t. et al., *Guided–Wave Optical Wavelength Demultiplexer Using An Asymmetric Y Junction;* Appl. Phys. Lett. 54(12), Mar. 20, 1989; pp. 1080–1082.

Nelson, W. et al., *Optical Switching Expands Communications–Network Capacity;* Laser Focus World, Jun. 1994, pp. 517–520.

Nelson, W.H. et al., *Wavelength–and Polarization–Independent Large Angle InP/InGaAsP Digital Optical Switches with Extinction Ratios Exceeding 20 dB;* IEEE Photonics Technology Letters, vol. 6, No. 11, Nov. 1994; pp. 1332–1334.

Noda, Y. et al., *High–Speed Electroabsorption Modulator with Strip–Loaded GaInAsP Planar Waveguide;* Journal of Lightwave Technology, vol. LT–4, No.10, Oct. 1986, pp. 1445–1453.

Offrein, B.J. et al., *Resonant Coupler–Based Tunable Add–After–Drop Filter in Silicon–Oxynitride Technology for WDM Networks,* Journal of Selected Topics in Quantum Electronics, vol. 5–No. 5, 1400–1405.

Okamoto, K. et al., *Arrayed–Waveguide Grating Multiplexer With Flat Spectral Response;* Optics Letters, Jan. 1, 1995; vol. 20, No. 1; pp. 43–45.

Okamoto, K. et al., *Flat Spectreal Response Arrayed–Waveguide Grating Multiplexer with Parabolic Waveguide Horns,* Electronic Letters Online, Jul. 15, 1996, No. 19961120, pp. 1661–1662.

Okayama, H. et al., *8×8 TrLiNbO₃ Waveguide Digital Optical Switch Matrix;* IEICE Trans. Commun.; vol. E77–B, No.2; Feb. 1944; pp. 204–208.

Okayama, H. et al., *Dynamic Wavelength Selective Add/Drop Node Comprising Tuneble Graftings, Electronic Letters Online,* Apr. 10, 1997, No. 19970607.

Okayama, H. et al., *Reduction of Voltage–Length Product for Y–Branch Digital Optical Switch,* Journal of Lightwave Technology, vol. 11, No.2, Feb. 1993; pp. 379–387.

Okuno, M. et al., *Strictly Nonblocking 16×16 Matrix Switch Using Silica Based Planar Lightwave Circuits,* vol. 10, No.266, Sep. 11, 1988.

Ooba, N. et al., *Athermal Silica–Based Arrayed–Waveguide Grating Multiplexer Using Bimetal Plate Temperature Compensator,* Electronics Letters, Oct. 12, 2000, vol. 36, No. 21, pp. 1800–1801.

Renaud, M. et al., *Compact Digital Optical Switches for Low Insertion Loss Large Switch Arrays on InP,* Proc. $21^{st}$ Eur.Conf.on Opt. Comm. (ECOC '95–Brussels), pp. 99–102.

Rickman, A.G. et al., *Silicon–on–Insulator Optical Rib Waveguide Loss and Mode Characteristics,* Journal of Lightwave Technology, Oct. 1994, vol. 12–No. 10, pp. 1771–1776.

Rolland, C. et al., *10 Gbit/s, 1.56 μm, Multiquantum Well InP/InGaAsP Mach–Zehnder Optical Modulator,* Electronics Letters, Mar. 4, 1993, vol. 29, No.5, pp. 471–472.

Santec Sales Brochure for year 2000 entitled "Optical Components".

Schauwecker, B. et al, *Small–Size Silicon–Oxynitride AWG Demultiplexer Operating Around 725 nm,* IEEE Photonics Technology Letters, vol. 12 No. 12, Dec. 2000.

Schlachetzki, A. *Monolithic IO–Technology–Modulators and Switches Based on InP,* SPIE vol. 651 Integrated Optical Circuit Engineering III (1966), pp. 60–86.

Silberberg, Y. et al., *Digital Optical Switch;* Appl. Phys. Letter; vol. 51, No. 16, Oct, 19, 1987, pp. 152–154.

Smit, M.K., *New Focusing and Dispersive Planar Component Based on an Optical Phased Array;* Electronics Letters; Mar. 31, 1988, vol. 24, No.7; pp. 385–386.

Smith, S.D. et al.., *CW Operation of Corner Cavity Semiconductor Lasers;* IEEE Photonics Technology Letters, vol. 5, No.8, Aug. 1993; pp. 876–879.

Sneh, A. et al., *Compact Low Crosstalk and Low Propagation Loss Quantum–Well Y–Branch Switches;* PDP 4–1–4–5.

Soole, J.B.D. et al., *Use of Multimode Interference Couplers to Broaden the Passband of Wavelength–Dispersive Integrated WDM Filters;* IEEE Photonics Technology Letters, vol. 8, No. 10, Oct. 1996; pp. 1340–1342.

Stoll, L. et al., *1:8 Optical Matrix Switch on InP/InGaAsP with Integrated Mode Transformers;* Optical Switches and Modulators II, pp. 531–534.

Stoll, L. et al. Compact and Polarization Independent Optical Switch on InP/InGaAsP; TuB7.2; pp. 337–340.

Stutius, W. et al, *Silicon Nitride Films on Silicon For Optical Waveguides,* Applied Optics, vol. 16, No.12, Dec. 1997, pp. 303–307.

Sugie, T. et al., *1.3–µm Laser Diodes with a Butt–jointed Selectively Grown Spot–Size Converter;* ThB2–6, IOOC95, pp. 52–53.

Tada, K. et al, *Bipolar Transistor Carrier–Injected Optical Modulator/Switch: Proposal and Analysis,* IEEE Electron Device Letters, vol. EDL–7, No. 11, Nov. 1986, pp. 605–605.

Takada, et al., *Optical Spectrum analyzer using Cascaded AWG's with Different Channel Spacings,* Photonics Technology Letters, Jul. 1999, vol. 11, No. 7, pp. 863–864.

Takahashi, H. et al., *Arrayed Waveguide Grating for Wavelength Division Multi/Demultilexer with Nanometre Resolution,* PWG–NTT–7.

Takiguchi, K. et al, *Dispersion Compensation Using a Planar Lightwave Circuit Optical Equalizer,* Photonics Technology Letters, Apr. 1994, vol. 6, No. 4, pp. 561–564.

Tien, P.K. et al., *Formation of Light–Guiding Interconnections in an Integrated Optical Circuit by Composite Tapered–Film Coupling,* Applied Optics, vol. 12, No. 8, Aug. 1973; pp. 1909–1916.

Toyoda et al., *Thermoplastic Switch and Wavelength Tunable Filter using Polymer Waveguides,* Abstract of paper presented at Opticomm 2001 on Aug. 22, 2001.

Treyz, G.V. et al., *Silicon Optical Modulators at 1.3 µm Based on Free–Carrier Absorption;* IEEE Electron Device Letters, vol. 12, No.6, Jun. 1991; pp. 276–278.

Tsuda, H. et al., *Performance Analysis of a Dispersion Compensator Using Arrayed–Waveguide Gratings,* Journal of Lightwave Technology, Aug. 2000, vol. 18–No.8, pp. 1139–1147.

Tsude, H. et al., *Second–and Third–Order Dispersion Compensator Using a High–Resolution Arrayed Waveguide Grating,* IEEE Photonics Technology Letters, May 1999, vol. 11–No. 5, 569–571.

Vinchant et al, *InP 4x4 Digital–Optical–Switch Module For Multiwavelength Cross–Connect Applications;* OF C '95 Technical Digest, Thursday ThK2, pp. 281–282.

Vinchant, J.F. et al, *First Polarisation insensitive 4x4 Switch matrix on InP with Digital Optical Switches,* TuB7.3, pp. 341–344.

Vinchant, J.F. et al, *InP Digital Optical Switch: Key Element for Guided–Wave Photonic Switching:* IEE Proceedings–J, vol. 140, No.5, Oct. 1993; pp. 301–307.

Vinchant, J.F. et al., *Low Driving Voltage or Current Digital Optical Switch on InP for Multiwavelength System Applications;* Electronics Letters, vol. 26, No. 12, Jun. 4, 1992; pp. 1135–1137.

Wakita, K. et al., *Long Wavelength Waveguide Multiple Quantum Well Optical Modulators;* IEEE Journal of Quantum Electronics, vol. QE–23, No. 12, Dec. 1987, pp. 2210–2215.

Wanru, Z. et al., *Total Internal Reflection Optical Switch with Injection Region Isolated by Oxygen Ion Implantation;* pp. 1–10.

Yamada, et al., *Cross Talk Reduction in a 10 GHz Spacing Arrayed–Waveguide Grating by Phase–Error Compensation,* Journal of Lightwave Technology, Mar. 1998, vol. 16–No. 3, pp. 364–371.

Yanagawa, H. et al., *Polarization–and Wavelength–insensitive Guided–Wave Optical Switch with Semiconductor Y Junction;* Journal of Lightwave Technology, vol. 8, No.8, Aug. 1990, pp. 1192–1197.

Yu, S. et al., *High Speed All–Optical Packet Routing Using a Vertical Coupler Crosspoint Space Switch.*

Yu, S. et al., *Ultralow Cross–Talk, compact integrated optical crosspoint space switch arrays employing active InGaAsP/InP Vertical Waveguide Couplers,* Integrated Optical Crosspoint Switch Arrays, Siyuan Yu et a, CPD24–2.

Znegerle, R. et al., *Tapered Twin Waveguides For Spot–Size Transformation in InP;* The B2–5; IOOC 95; pp. 50–51.

Zirngibl, M. et al., *Digitally Tunable Laser Based On The Integration Of A Waveguide Grating Multiplexer And An Optical Amplifier,* IEEE Photonics Technology Letters, Apr, 1994, vol. 6–No. 4, pp. 516–517.

Zucker, J.E. et al., *Strained Quantum Wells for Polarization–Independent Electrooptic Waveguide Switches,* Journal of Lightwave Technology, vol. 10, No.12, Dec. 1992, pp. 1926–1930.

Doerr, C. R. et al., *2x2 Waveength–Selective Cross Connect Capable of Switching 128 Channels in Sets of 8,* PD8, pp. 1–3.

Doerr, C. R. et al., *Automatic Wavelength Channel–By–Channel Equalizer,* PD20, pp. 227–229.

Okayama, H. et al., *Dynamic Wavelength Selective Add/Drop Node Comprising Tunable Gratings,* Electronics Letters Online No. 19970607, Apr. 10, 1997.

Okayama, H. et al., *Node Comprising Tunable Gratings,* Electronics Letters, May 8, 1997, vol. 33, No. 10, pp. 881–882.

Roeloffzen, C. G. H. et al., *Tunable Passband Flattened 1–from–16 Binary–Tree Structured Add–After–Drop Multiplexer Using SiON Waveguide Technology,* IEEE Photonics Technology Letters, vol. 12, No. 9, Sep. 2000, pp. 1201–1203.

2000 Optical Components, Santec Corporation, pp. 1–4.

* cited by examiner

TUNABLE ADD/DROP NODE

RELATED APPLICATIONS

This application is related to U.S. patent application Ser. No. 09/872,472; filed on Jun. 1, 2001; entitled "Tunable Optical Filter" and incorporated herein in its entirety which is related to U.S. patent application Ser. No. 09/845,685; filed on Apr. 30, 2001; and entitled "Tunable Filter".

BACKGROUND

1. Field of the Invention

The invention relates to optical networking components. In particular, the invention relates to add/drop nodes.

2. Background of the Invention

Optical networks often include optical fibers for carrying a beam of light having a plurality of channels. Add drop nodes are often employed to add and/or drop channels from the beam of light.

A tunable add/drop node allows the channels added and/or dropped from the beam of light to be tuned. Many add/drop nodes have undesirably low tuning ranges. Further, add/drop nodes often have undesirably large power requirements. For the above reasons, there is a need for a tunable add/drop node having a wide turning range and/or reduced power requirements.

SUMMARY OF THE INVENTION

The invention relates to an add/drop node. The add/drop node includes a first filter configured to receive a light beam having a plurality of channels on an input waveguide. The first filter is also configured to direct channels having wavelengths falling within a plurality of first wavelength bands to a transition waveguide. The add/drop node also includes a second filter configured to receive the channels directed to the transition waveguide. The second filter is configured to direct channels having wavelengths falling within a plurality of second wavelength bands to a drop waveguide. The first filter and/or the second filter can be tunable.

In some instances, the first filter receives the light beam from an input waveguide. The first filter is also configured to receive a second light beam having one or more channels on an add waveguide and to direct channels that do not have wavelengths falling within the plurality of first wavelength bands from the add waveguide to the drop waveguide.

The invention also relates to a method of operating an add/drop node. The method includes selecting a target wavelength to be dropped by the add/drop node. The add/drop node has a first filter in optical communication with a second filter. The first filter is configured to direct channels having wavelengths falling within a plurality of first wavelength bands from an input waveguide to the second filter. The second filter is configured to direct channels having wavelengths falling within a plurality of second wavelength bands to a drop waveguide. The method also includes tuning the first filter such that a first wavelength band includes the target wavelength. In some instances, the method also includes tuning the second filter such that a second wavelength band includes the target wavelength.

Another embodiment of the method includes selecting a target wavelength to be dropped by the add/drop node. The add/drop node has a first filter in optical communication with a second filter. The first filter is configured to direct channels having wavelengths falling within a plurality of first wavelength bands from an input waveguide to the second filter. The second filter is configured to direct channels having wavelengths falling within a plurality of second wavelength bands to a drop waveguide. The method also includes tuning the second filter such that a second wavelength band includes the target wavelength.

Another embodiment of the method includes selecting a target wavelength to be added by the add/drop node. The node has a first filter in optical communication with a second filter. The first filter is configured to direct channels having wavelengths falling within a plurality of first wavelength bands from an add waveguide to a pass waveguide and to direct channels having wavelengths that do not fall within a plurality of first wavelength bands from the add waveguide to the second filter. The method also includes tuning the first filter such that a first wavelength band includes the target wavelength.

DETAILED DESCRIPTION OF THE PREFERRED EMBODIMENT

The invention relates to an add/drop node. The add/drop node includes a first filter configured to receive a light beam having a plurality of channels. The first filter directs channels having wavelengths falling within a plurality of first wavelength bands to a transition waveguide. The add/drop node also includes a second filter configured to receive the channels directed to the transition waveguide. The second filter is configured to direct channels having wavelengths falling within a plurality of second wavelength bands to a drop waveguide.

The first filter and/or the second filter can be tunable in that the selection of wavelengths in a wavelength band can be tuned. The add/drop node is tuned to direct a channel having a target wavelength to the drop waveguide by tuning the first filter and/or the second filter such that the one of the first wavelength bands includes the target wavelength and one of the second wavelength bands includes the target wavelength. Hence, the system can be tuned to the target wavelength by tuning the first filter and/or the second filter such that the wavelength bands of the first filter and the wavelength bands of the second filter overlap at the target wavelength. The first filter and the second filter can be constructed so the first wavelength bands that do not include the target wavelength and the second wavelength bands that do not include the target wavelength do not overlap. As a result, the output node will output only the target wavelength on the drop node.

The first wavelength bands can be separated by gaps and the second wavelength bands can be separated by gaps. The gaps between the wavelength bands can be less than the desired tuning range of the add/drop node. As a result, the first wavelength bands and the second wavelength bands can be made to include any target wavelength within the desired tuning range of the add/drop node by tuning the first filter and/or the second filter over a range that is smaller than the desired tuning range of the optical filter system. As a result, the tuning range requirements of the first filter and/or the second filter can be less than the desired tuning range of the add/drop node.

Because the tuning range of the first filter and/or the second filter is reduced, the power requirements of the add/drop node are reduced. Additionally, reducing the tuning range of a filter reduces the amount of bandwidth change that occurs in response to tuning. As a result, the add/drop node is associated with reduced bandwidth changes in response to tuning.

Figure 1:
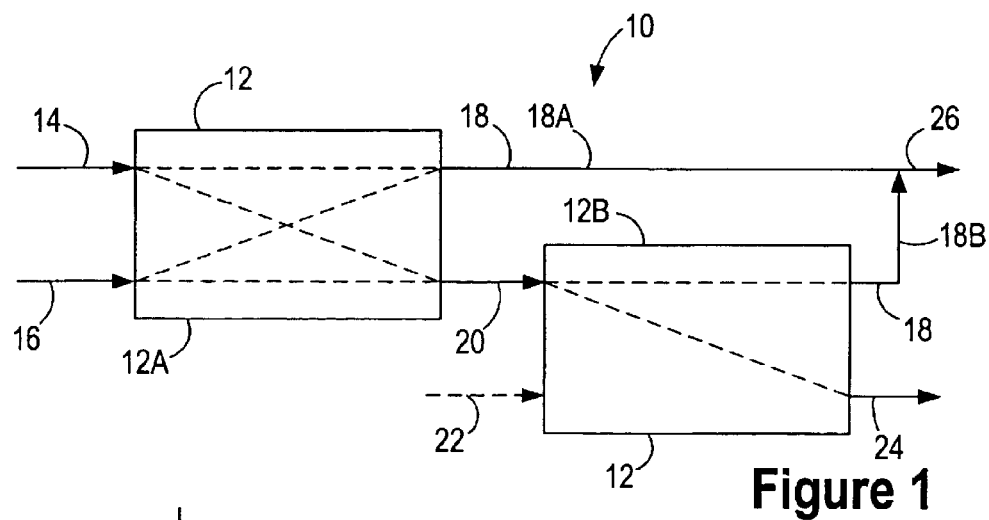
FIG. 1 illustrates an add/drop node having a first filter in optical communication with a second filter.

FIG. 1 illustrates an add/drop node 10 having a plurality of filters 12. The add/drop node 10 includes an input waveguide 14, an add waveguide 16, a first pass waveguide 18A and a transition waveguide 20 in optical communication with a first filter 12A. The transition waveguide 20 provides optical communication between the first filter 12A and a second filter 12B. The second filter 12B is in optical communication with a dummy waveguide 22, a second pass waveguide 18B and a drop waveguide 24. The first pass waveguide 18A and the second pass waveguide 18B intersect with an output waveguide 26. The dummy waveguide is optional and when present need not be used.

During operation of the add/drop node 10, the input waveguide 14 carries a beam of light having a plurality of channels to the first filter 12A. The first filter 12A filters the channels such that channels having wavelengths within a plurality of first wavelength bands are directed to the transition waveguide 20 and channels that do not have wavelengths within the first wavelength bands are directed to a first pass waveguide 18A.

The channels directed to the transition waveguide 20 are carried to the second filter 12B. The second filter 12B filters the channels such that channels having wavelengths within a plurality of second wavelength bands are directed to the drop waveguide 24 and channels that do not have wavelengths within the first wavelength bands are directed to a second pass waveguide 18B.

The channels carried on the first pass waveguide 18A and the second pass waveguide 18B are combined on the output waveguide 26. The lengths of the first pass waveguide 18A and the second pass waveguide 18B can be selected so the channels that pass through the first pass waveguide 18A and channels that pass through the second pass waveguide 18B are in the same phase relative to one another as they are carried in the input waveguide 14 and in the output waveguide 26 although this arrangement is not always necessary.

During operation of the add/drop node 10, the add waveguide 16 can also carry a beam of light having one or more channels to the first filter 12A. The first filter 12A filters the channels from the add waveguide 16 such that such that channels having wavelengths within the first wavelength bands are directed to the first pass waveguide 18A and channels that do not have wavelengths within the first wavelength bands are directed to the transition waveguide 20.

Figure 2A:
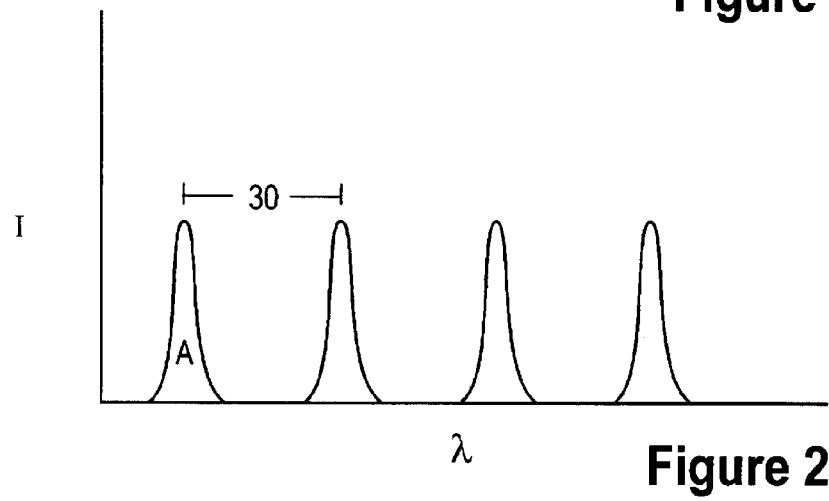
FIG. 2A illustrates the output profile of a filter. The output profile of the filter illustrates the wavelength bands associated with the filter.

FIG. 2A illustrates a portion of an output profile for a filter 12. The output profile illustrates relative intensities of the wavelength bands that the filter 12 will direct to a particular waveguide. The illustrated filter 12 is a periodic filter 12 in that the wavelength bands are separated by a gap 30 that is about the same for each pair of adjacent wavelength bands. Accordingly, the wavelength bands are separated by a substantially constant band period. In some instances, the band period is known as the free spectral range. Although the illustrated output profile is for a periodic filter 12, the filter 12 need not be periodic.

For the purposes of simplifying the following discussions, the output profile of the first filter 12A shows the wavelength bands for channels directed to the transition waveguide 20 and the output profile of the second filter 12B is the output profile for the channels directed to the drop waveguide 24.

Figure 2B:
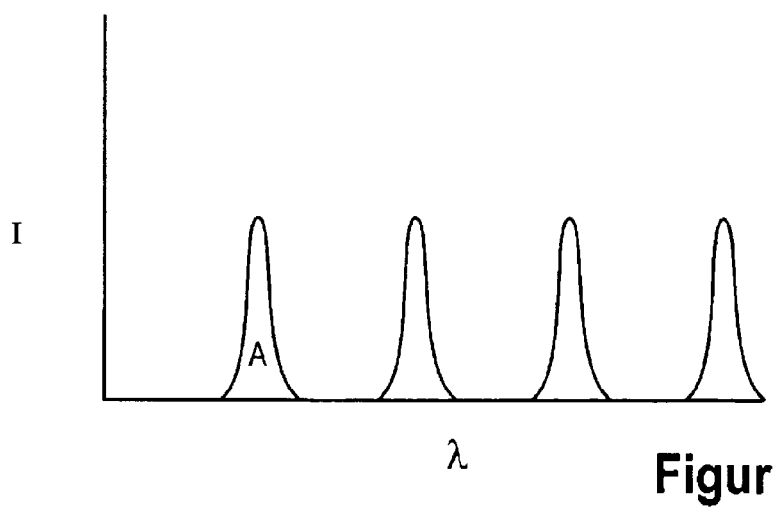
FIG. 2B illustrates the output profile of the filter shown in FIG. 2A after tuning of the filter.

The first filter 12A and/or the second filter 12B can be tunable. Tuning a filter 12 causes the wavelengths in one or more wavelength bands to shift. For instance, FIG. 2B illustrates the output profile of the filter 12 associated with FIG. 2A after tuning. The filter 12 has been tuned such that the wavelength bands shift toward longer wavelengths. As a result, the band labeled A is shown further to the right in FIG. 2B than in FIG. 2A. Although the filter 12 is shown as being tuned so the wavelength bands shift toward longer wavelengths, the filters 12 can also be tuned so the wavelength bands shift toward shorter wavelengths.

FIG. 2A and FIG. 2B show the filter 12 tuned so the pattern of wavelength bands and gaps 30 remains substantially constant during tuning. However, many filters 12 are inherently associated with some change to the bandwidth of the wavelength bands in response to tuning. As a result, the pattern of wavelength bands and gaps 30 can often not be exactly preserved during tuning. Further, in some instances, the filter 12 is tuned so the wavelength bands shift relative to one another.

Figure 3A:
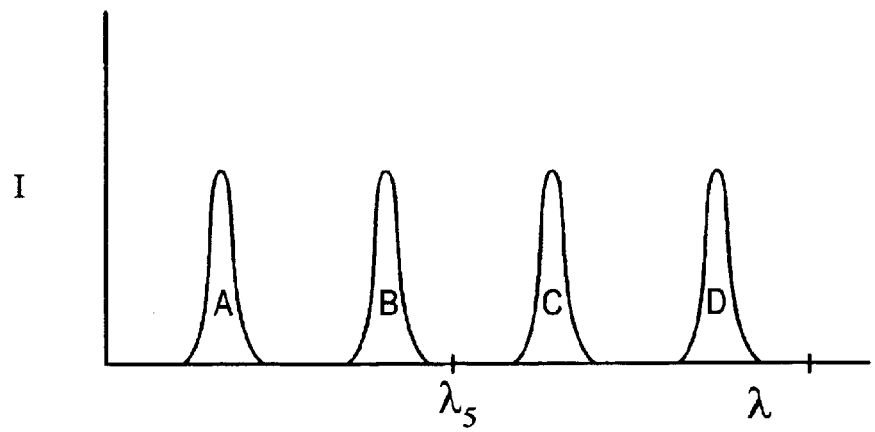
FIG. 3A illustrates the output profile of a first filter.
Figure 3B:
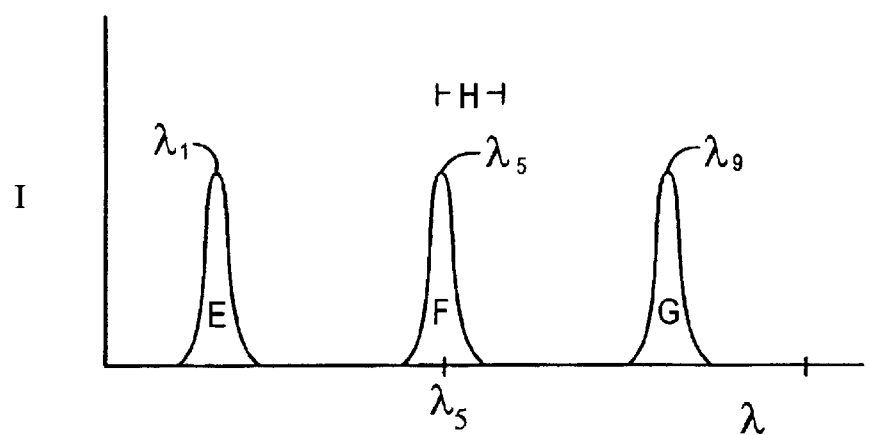
FIG. 3B illustrates the output profile of a second filter.

The pattern of wavelength bands and wavelength band gaps 30 associated with the first filter 12A can be different than the wavelength band gaps 30 associated with the second filter 12B. For instance, when the first filter 12A and the second filter 12B are periodic filters 12, the first filter 12A can have a smaller band period than the second filter 12B as shown in FIG. 3A and FIG. 3B. FIG. 3A could be the output profile of the first filter 12A and FIG. 3B could be the output profile of the second filter 12B.

Figure 3C:
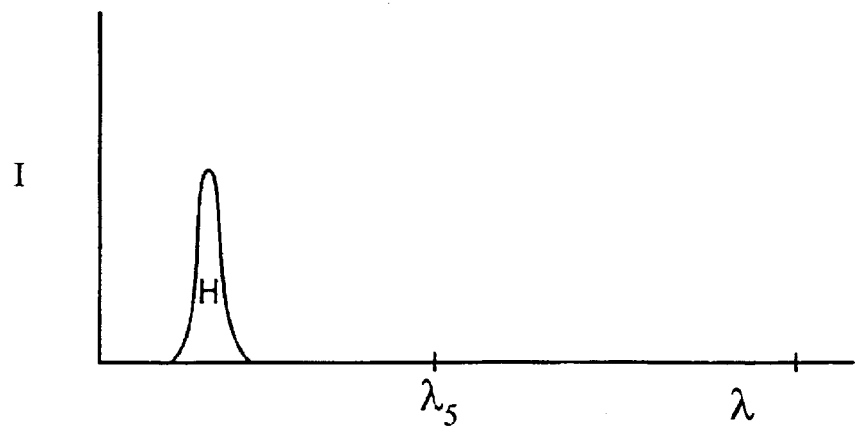
FIG. 3C illustrates the output profile of an add/drop node having the first filter of FIG. 3A and the second filter of FIG. 3B.

In the add/drop node 10 of FIG. 1, the second filter 12B filters the channels carried on the transition waveguide 20. As a result, the drop waveguide 24 can carry only the channels that the first filter 12A directs to the transition waveguide 20 and that the second filter 12B directs to the drop waveguide 24. Hence, the output profile for the drop waveguide 24 of the add/drop node 10 is generated from the overlap of the output profile of the first filter 12A and the output profile of the second filter 12B. FIG. 3C illustrates the output profile for an add/drop node 10 including a first filter 12A with the output profile of FIG. 3A and a second filter 12B with the output profile of FIG. 3B. The wavelength band labeled A in FIG. 3A and the wavelength band labeled E in FIG. 3B overlap while no other wavelength bands substantially overlap. As a result, the output profile shown in FIG. 3C shows only the wavelength band labeled H where the wavelength band labeled A and the wavelength band labeled E overlap. Accordingly, the drop waveguide 24 will carry only channels having wavelengths within the wavelength band labeled H. Although the first filter 12A is shown as having a smaller band period than the second filter 12B, the first filter 12A can have a larger band period than the second filter 12B.

When overlap occurs at more than one wavelength band, the drop waveguide 24 can carry channels having wavelengths in more than one wavelength band. Accordingly, when it is desired that the add/drop node 10 produce output light signals having wavelengths in a single wavelength band, the band period of the first filter 12A and the second filter 12B are selected or tuned such that the wavelength band overlap can be achieved for only one wavelength band in the desired tuning range of the add/drop node 10.

The first filter 12A and/or the second filter 12B can be tunable to provide a tunable add/drop node 10. For instance, a tunable add/drop node 10 can be achieved when the second filter 12B is fixed and the first filter 12A is tunable. FIG. 3A can be the output profile of a tunable first filter 12A and FIG. 3B can be the output profile of a fixed second filter 12B. The fixed second filter 12B is constructed to have an output profile with wavelength bands that include the wavelengths of channels that may be targeted for dropping by the add/drop node 10. As an example, FIG. 3B illustrates an output profile where the wavelength bands include the wavelengths of the channels labeled $\lambda_1$, $\lambda_5$, $\lambda_9$. As a result, an add/drop node 10 having a second filter 12B constructed with an output profile according to FIG. 3B would be able to output channels $\lambda_1$, $\lambda_5$ and/or $\lambda_9$ but not channels $\lambda_2$–$\lambda_4$, $\lambda_6$–$\lambda_8$.

Figure 4A:
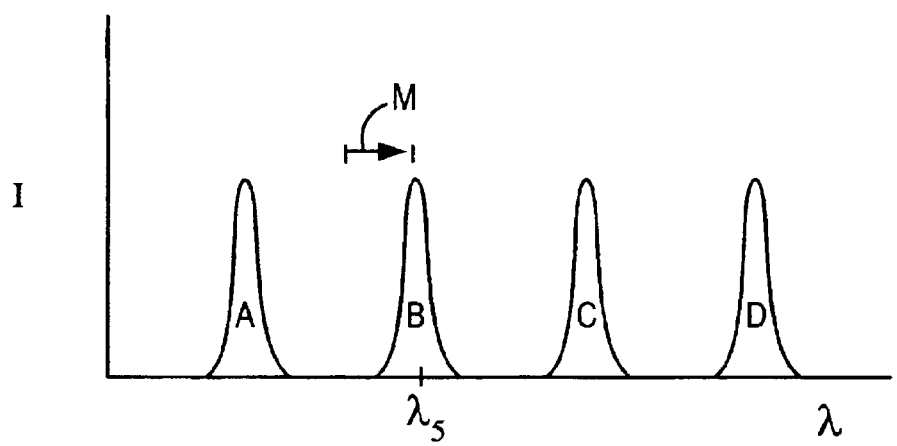
FIG. 4A illustrates the output profile of the first filter associated with FIG. 3A after tuning.
Figure 4B:
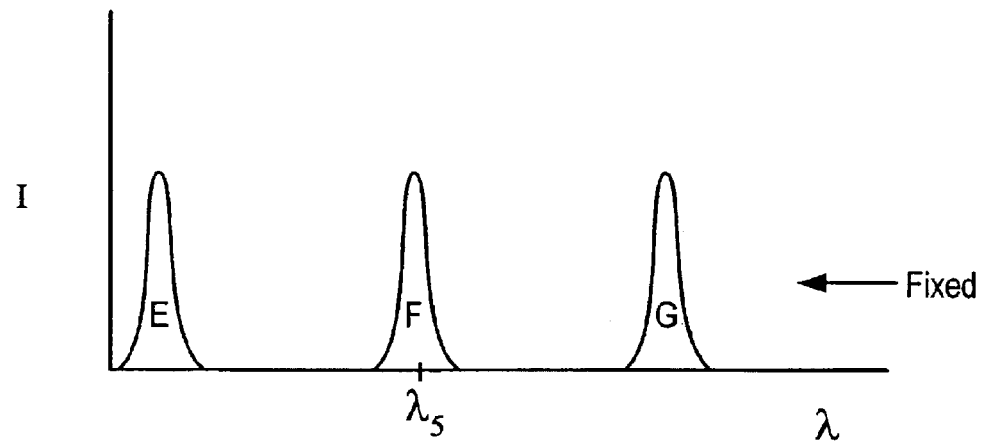
FIG. 4B illustrates the output profile of FIG. 3B.
Figure 4C:
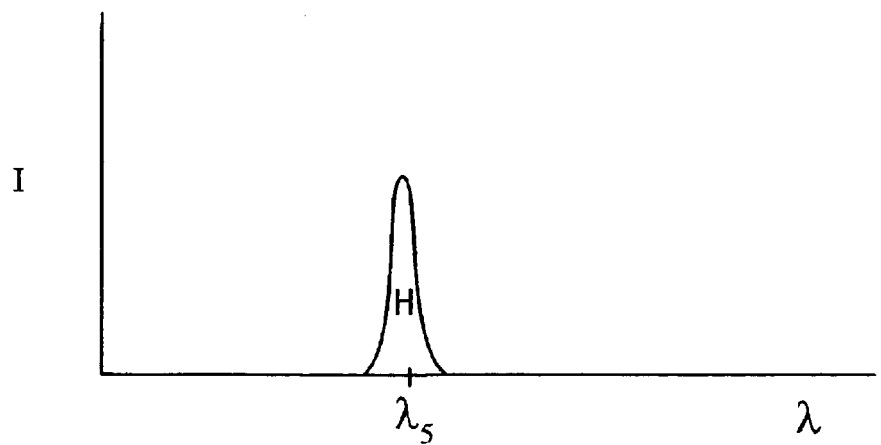
FIG. 4C illustrates the output profile of an add/drop node having the first filter of FIG. 4A and the second filter of FIG. 4B.

The add/drop node 10 constructed with the filters of FIG. 3A and FIG. 3B can be tuned to direct a target wavelength associated with a target channel from the input waveguide 14 to the drop waveguide 24. For instance, the add/drop node 10 can be tuned so as to drop the channel labeled $\lambda_5$ in FIG. 3B from the input waveguide 14 to the drop waveguide 24. FIG. 4A through FIG. 4C illustrates the add/drop node 10 of FIG. 3A through FIG. 3C tuned to drop the channel labeled $\lambda_5$. FIG. 4A illustrates the output profile of the first filter 12A. FIG. 4B illustrates the output profile of the second filter 12B. FIG. 4C illustrates the output profile of the add/drop node 10. FIG. 4A shows the first filter 12A tuned so the wavelength band labeled B is shifted to include the wavelength associated with the channel labeled $\lambda_5$. This movement is illustrated by the arrow labeled M in FIG. 4A. Because the second filter 12B is fixed, FIG. 4B is the same as FIG. 3B. The wavelength band labeled F in FIG. 4B includes wavelength associated with the channel labeled $\lambda_5$. The output profile of the add/drop node 10 shown in FIG. 4C shows a wavelength band labeled H at the overlap of wavelength band labeled B in FIG. 4A and the wavelength band labeled F in FIG. 4B. As a result, the add/drop node 10 directs channels having wavelengths with in the wavelength band labeled H from the input waveguide 14 to the drop waveguide 24. Because the wavelength associated with the channel labeled $\lambda_5$ falls within the wavelength band labeled H, the drop waveguide 24 carries the channel labeled $\lambda_5$.

When the first filter 12A and the second filter 12B are each periodic and one is tunable and the other is fixed, the add/drop node 10 can be tuned to produce channels having wavelengths in any of the wavelength bands of the fixed filter 12 by tuning the tunable filter 12 over a range less than or equal to the band period of the tunable filter 12. As a result, the tunable filter 12 need only have a tuning range equal to the band period. Hence, the add/drop node 10 can have a tuning range that is larger than the tuning range of the tunable filter 12. Because a narrow tuning range is associated with reduced power requirements, the reduced tuning range of the tunable filter 12 reduces the power requirements of the add/drop node 10. Further, reducing the range over which a filter 12 is tuned reduces the changes in bandwidth associated with the tunable filter 12. As a result, the add/drop node 10 is associated with a reduced change in bandwidth over the entire tuning range of the add/drop node 10.

Although the second filter 12B is described as being fixed and the first filter 12A is described as being tunable, the same effects can be achieved with the second filter 12B being tunable and the first filter 12A being fixed.

Although the above description describes the first filter 12A or the second filter 12B as being a fixed filter 12, the first filter 12A and the second filter 12B can both be tunable. For instance, FIG. 3A can be the output profile of a tunable first filter 12A and FIG. 3B can be the output profile of a tunable second tunable filter 12. Although the first filter 12A is shown as having a smaller band period than the second filter 12B, the first filter 12A can have a larger band period than the second filter 12B.

Figure 5A:
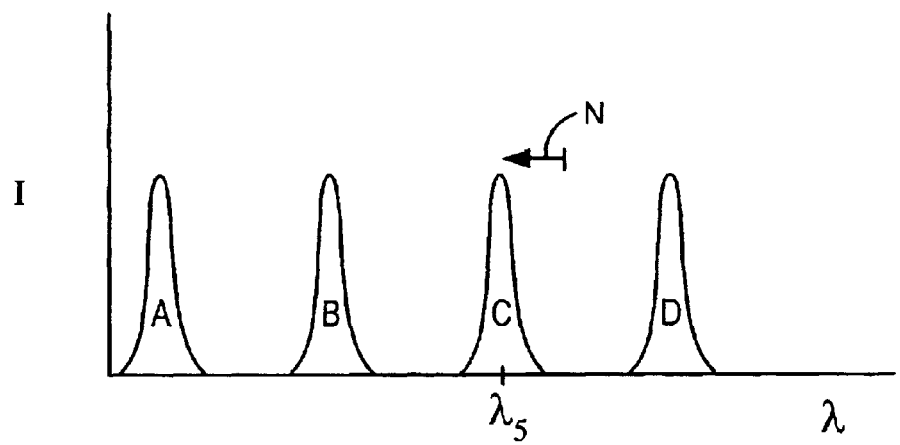
FIG. 5A illustrates the output profile of the first filter associated with FIG. 3A after tuning.
Figure 5B:
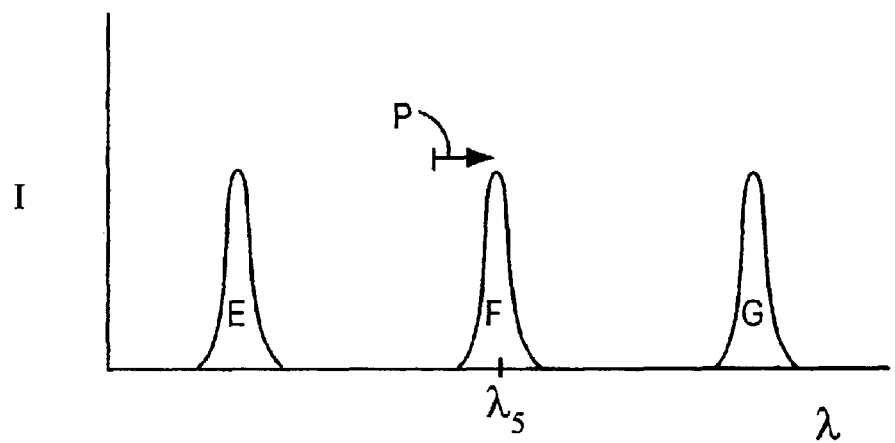
FIG. 5B illustrates the output profile of the second filter associated with FIG. 3B after tuning.
Figure 5C:
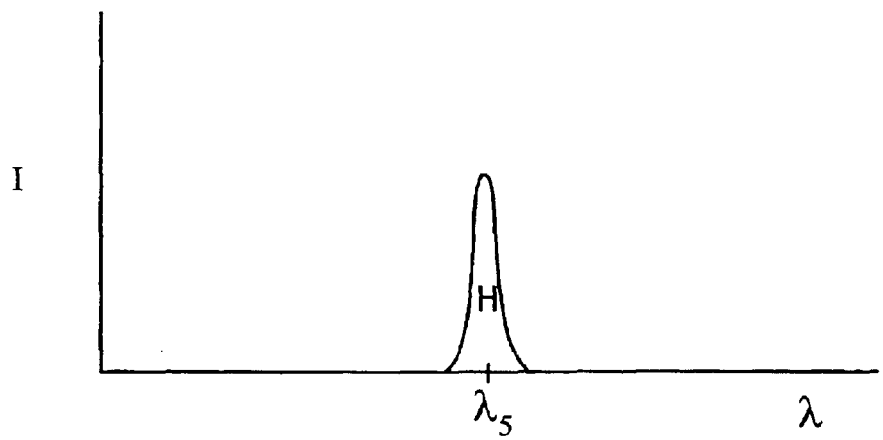
FIG. 5C illustrates the output profile of an add/drop node having the first filter of FIG. 5A and the second filter of FIG. 5B.

The add/drop node 10 can be tuned to direct the channel labeled $\lambda_5$ in FIG. 3B from the input waveguide 14 to the drop waveguide 24. For instance, FIG. 5A through FIG. 5C illustrates the optical component 40 system of FIG. 3A through FIG. 3C tuned to so as to direct the channel labeled $\lambda_5$ from the input waveguide 14 to the drop waveguide 24. FIG. 5A illustrates the output profile of the tunable first filter 12A. FIG. 5B illustrates the output profile of the tunable second filter 12B. FIG. 5C illustrates the output profile of the add/drop node 10. As shown by the arrow labeled N, the first filter 12A is tuned so the wavelength band labeled C overlaps with the wavelength associated with the channel labeled $\lambda_5$. As shown by the arrow labeled P, the second filter 12B is tuned so the wavelength band labeled F overlaps with the wavelength associated with the channel labeled $\lambda_5$. The output profile of the add/drop node 10 shown in FIG. 5C shows a wavelength band labeled H at the overlap of wavelength band labeled C in FIG. 5A and the wavelength band labeled F in FIG. 5B. As a result, the add/drop node 10 directs channels having wavelengths in the wavelength band labeled H from the input waveguide 14 to the drop waveguide 24. Because the wavelength associated with the channel labeled $\lambda_5$ falls within the wavelength band labeled H, the drop waveguide 24 carries the channel labeled $\lambda_5$.

The add/drop node 10 of FIG. 5A through FIG. 5C can be tuned to any wavelength in the desired range by constructing the first filter 12A such that the tuning range of the first filter 12A is at least equal to the band period of the first filter 12A and by constructing the second filter 12B such that the tuning range of the second filter 12B is at least equal to the band period of the second filter 12B. As a result, the tuning range of a filter 12 can be as small as the period of the filter 12 while providing the add/drop node 10 with a large tuning range. The add/drop node 10 can be constructed such that the tuning range of the add/drop node 10 is wide enough to cover the C or L band. As described above, the reduced tuning range requirements for the filters 12 can reduce the power requirements of the add/drop node 10 and reduced bandwidth changes over the tuning range of the add/drop node 10.

The above description of FIG. 3A through FIG. 5C is directed to tuning the add/drop node 10 to direct channel(s) from the input waveguide 14 to the output waveguide 26. Tuning the add/drop node 10 to direct channel(s) from the input waveguide 14 to the output waveguide 26 can also cause a channel(s) from the add waveguide 16 to be directed to the output waveguide 26. As a result, the above description also applies to operating the add/drop node 10 so as to add a channel.

The wavelength bands of the first filter 12A can be different from the wavelength bands of the second filter 12B. The filter 12 with the narrower bandwidth covering a particular range wavelength determines the bandwidth for the add/drop node 10 at that range of wavelengths. When each of the filters 12 is tunable, providing one of the filters 12 with a larger bandwidth than the other filter 12 reduces the accuracy that is required when tuning the filters 12 such that the wavelength bands overlap. For instance, only the filter 12 with the narrower bandwidth needs to be precisely tuned to a particular wavelength band. The filter 12 with the broader bandwidth can be tuned so as to overlap the narrower bandwidth but does not need precise tuning. When one of the filters 12 is not tunable, the tunable filter 12 can have the narrower bandwidth. The wavelength bands associated with the fixed filter 12 can drift due to effects such as temperature changes; however, the increased bandwidth of the fixed filter 12 allows the fixed filter 12 to continue producing light signals with the desired wavelengths. Alternatively, the tunable filter 12 can have the broader bandwidth. The increased width allows the tunable filter 12 to be easily tuned to overlap the narrower wavelength band of the fixed filter 12 and also reduce the bandwidth narrowing effect.

Figure 6:
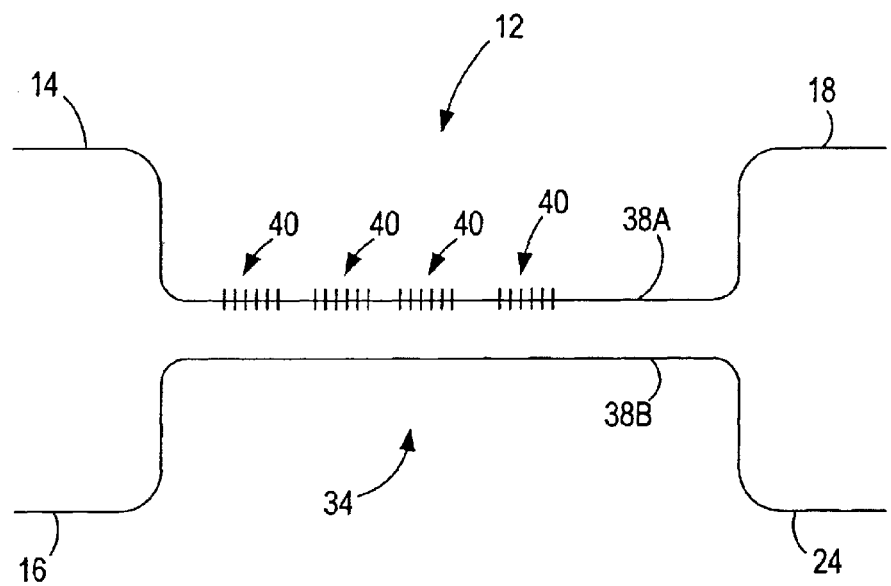
FIG. 6 illustrates a filter that is suitable for use as a first filter and/or a second filter. The filter employs a plurality of transmission type gratings.

FIG. 6 illustrates an example of a suitable filter 12 for use as the first filter 12A and/or the second filter 12B. The filter 12 includes a directional coupler 34 in optical communication with an input waveguide 14, an add waveguide 16, a pass waveguide 18 and a drop waveguide 24.

The directional coupler 34 includes a first waveguide 38A providing optical communication between the input waveguide 14 and the pass waveguide 18. The directional coupler 34 also includes a second waveguide 38B providing optical communication between an add waveguide 16 and a drop waveguide 24. When the filter 12 illustrated in FIG. 6 serves as the first filter 12A, the drop waveguide 24 serves as the transition waveguide 20 and the pass waveguide 18 serves as the first pass waveguide 18A. When the second illustrated in FIG. 6 serves as the second filter 12B, the input waveguide 14 serves as the transition waveguide 20 and the pass waveguide 18 serves as the second pass waveguide 18B and the add waveguide 16 serves as the dummy waveguide 22. Because the add waveguide 16 serves as the dummy waveguide 22 when the filter 12 is employed as the second filter 12B, the add waveguide 16 is not required when the filter 12 is employed as a second filter 12B.

The directional coupler 34 further includes a plurality of co-directional gratings 40 also known as transmission type gratings 40. Each grating 40 is associated with a wavelength band. For instance, each grating 40 couples channels traveling along the first waveguide 38A into the second waveguide 38B when the channels have wavelengths within the associated wavelength band. Additionally, each grating 40 couples channels traveling along the second waveguide 38B into the first waveguide 38A when the channels have wavelength within the associated wavelength band.

During operation of a filter 12 constructed according to FIG. 6, the input waveguide 14 carries a beam of light having a plurality of channels to the first waveguide 38A. Each grating 40 directs channels having wavelengths in the associated wavelength band into the second waveguide 38B. The channels having wavelengths that are not included in the wavelength band associated with any of the gratings 40 continue along the first waveguide 38A to the pass waveguide 18. The channels directed to the second waveguide 38B travel along the second waveguide 38B to the drop waveguide 24. As a result, the filter 12 directs channels having wavelengths associated with the gratings 40 from the input waveguide 14 to the drop waveguide 24 and directs channels having wavelengths are not associated with the gratings 40 from the input waveguide 14 to the pass waveguide 18.

During operation of the filter 12, the add waveguide 16 can also carry one or more channels to the directional coupler 34. The beam of light travels from the add waveguide 16 into the second waveguide 38B. Each grating 40 directs channels having wavelengths in the associated wavelength band into the first waveguide 38A. The channels having wavelengths that are not included in the wavelength band associated with any of the gratings 40 continue along the second waveguide 38B to the drop waveguide 24. The channels directed to the first waveguide 38A travel along the first waveguide 38A to the pass waveguide 18. As a result, the filter 12 directs channels having wavelengths associated with the gratings 40 from the add waveguide 16 to the pass waveguide 18 and directs channels having wavelengths are not associated with the gratings 40 from the add waveguide 16 to the drop waveguide 24.

The gratings 40 are constructed to achieve a particular output profile for the channels directed to the drop waveguide 24. For instance, when the desired output profile has three wavelength bands, the directional coupler 34 can include three gratings 40. Each of the gratings 40 is constructed so as to be associated with a particular wavelength band of the desired output profile. For instance, each grating 40 is constructed so as to direct from to the second waveguide 38B channels having the wavelengths in one of the wavelength bands of the desired output profile. As a result, when the filter 12 is to be a periodic filter 12, the gratings 40 are constructed to direct channels having periodically spaced wavelength bands onto the second waveguide 38I.

Figure 7:
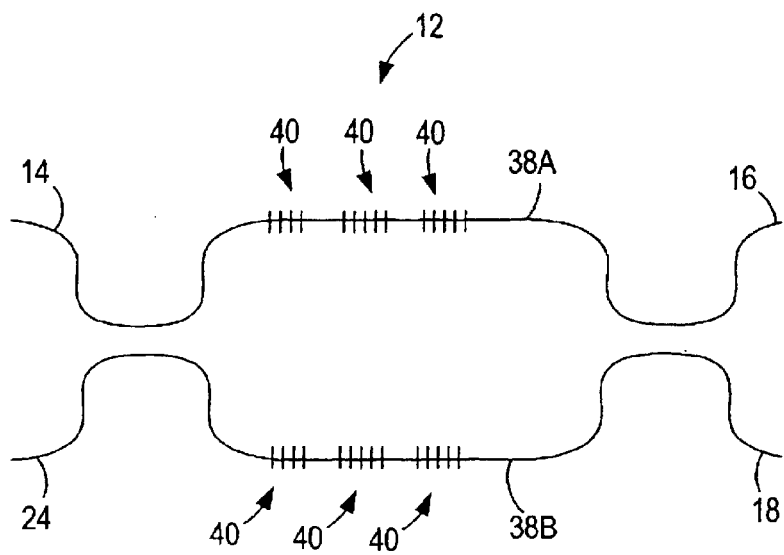
FIG. 7 illustrates another example of a filter that is suitable for use as a first filter and/or a second filter. The filter employs a plurality of reflection type gratings.

FIG. 7 illustrates another example of a suitable filter 12 for use as the first filter 12A and/or the second filter 12B. The filter 12 includes a first coupler in optical communication with an input waveguide 14, a drop waveguide 24, a first waveguide 38A and a second waveguide 38B. A second coupler is in optical communication with the first waveguide 38A, the second waveguide 38B, an add waveguide 16 and an output waveguide 26. A suitable coupler for use as the first coupler and/or the second coupler include, but are not limited to, a 3 dB coupler and a multi-mode interference (MMI) 3 db coupler.

When the filter 12 illustrated in FIG. 7 serves as the first filter 12A, the drop waveguide 24 serves as the transition waveguide 20 and the pass waveguide 18 serves as the first pass waveguide 18A. When the second illustrated in FIG. 7 serves as the second filter 12B, the input waveguide 14 serves as the transition waveguide 20 and the pass waveguide 18 serves as the second pass waveguide 18B and the add waveguide 16 serves as the dummy waveguide 22. Because the add waveguide 16 serves as the dummy waveguide 22 when the filter 12 is employed as the second filter 12B, the add waveguide 16 is not required when the filter 12 is employed as a second filter 12B.

A plurality of contradirectional gratings 40, also known as reflection type gratings 40, are positioned along the first waveguide 38A and a plurality of gratings 40 are positioned along the second waveguide 38B. Each grating 40 is associated with a wavelength band. For instance, each grating 40 reflects channels having wavelengths within the wavelength band associated with the grating 40 and transmits channels that do not have wavelengths within the wavelength band associated with the grating 40. The gratings 40 positioned along the first waveguide 38A can match the gratings 40 positioned along the second waveguide 38B.

During operation of a filter 12 constructed according to FIG. 7, the input waveguide 14 carries a beam of light having a plurality of channels to the first coupler. When the first coupler is a 3 dB coupler, the intensity of each wavelength is split about evenly among the first waveguide 38A and the second waveguide 38B. As a result, the channels continue along the first waveguide 38A and the second waveguide 38B at an intensity that is reduced relative to the intensity on the input waveguide 14.

Each grating 40 positioned along the first waveguide 38A reflects the channels having wavelengths within the wavelength band associated with the grating 40. The reflected channels return to the first coupler along the first waveguide 38A. Each grating 40 positioned along the second waveguide 38B reflects the channels having wavelengths within the wavelength band associated with the grating 40. The reflected channels return to the first coupler along the second waveguide 38B. In instances where the gratings 40 positioned along the first waveguide 38A match the gratings 40 positioned along the second waveguide 38B, the channels reflected back to the first coupler along the first waveguide 38A match the channels reflected back to the first coupler along the second waveguide 38B.

The first and second waveguide 38Bs have lengths selected to cause a phase difference between the channels that travel to the first coupler along the first waveguide 38A and the second waveguide 38B. The phase differential causes the channels reflected on both the first waveguide 38A and the second waveguide 38B to be directed onto the drop waveguide 24. As a result, the filter 12 directs channels having wavelengths associated with the gratings 40 from the input waveguide 14 to the drop waveguide 24.

Each grating 40 positioned along the first waveguide 38A transmits the channels that do not have wavelengths within the wavelength band associated with the grating 40. The transmitted channels travel to the second coupler along the first waveguide 38A. A grating 40 positioned along the second waveguide 38B transmits the channels that do not have wavelengths within the wavelength band associated with the grating 40. The transmitted channels travel to the second coupler along the second waveguide 38B. In instances where the gratings 40 positioned along the first waveguide 38A match the gratings 40 positioned along the second waveguide 38B, the channels transmitted to the second coupler along the first waveguide 38A match the channels transmitted to the second coupler along the second waveguide 38B.

The first and second waveguide 38Bs have lengths selected to cause a phase difference between the channels that travel to the second coupler along the first waveguide 38A and the second waveguide 38B. The phase differential causes the channels transmitted along both the first waveguide 38A and the second waveguide 38B to be directed onto the pass waveguide 18. As a result, the filter 12 directs channels having wavelengths that are not associated with the gratings 40 from the input waveguide 14 to the pass waveguide 18.

During operation of the filter 12, the add waveguide 16 can also carry one or more channels to the second coupler. When the second coupler is a 3 dB coupler, the intensity of each wavelength is split about evenly among the first waveguide 38A and the second waveguide 38B. A grating 40 positioned along the first waveguide 38A reflects the channels having wavelengths within the wavelength band associated with the grating 40. The reflected channels return to the second coupler along the first waveguide 38A. A grating 40 positioned along the second waveguide 38B reflects the channels having wavelengths within the wavelength band associated with the grating 40. The reflected channels return to the second coupler along the second waveguide 38B. The second coupler directs the channels reflected on both the first waveguide 38A and the second waveguide 38B onto the pass waveguide 18. As a result, the filter 12 directs channels having wavelengths associated with the gratings 40 from the add waveguide 16 to the pass waveguide 18.

A grating 40 positioned along the first waveguide 38A transmits the channels from the add waveguide 16 that do not have wavelengths within the wavelength band associated with the grating 40. The transmitted channels travel to the first coupler along the first waveguide 38A. A grating 40 positioned along the second waveguide 38B transmits the channels from the add waveguide 16 that do not have wavelengths within the wavelength band associated with the grating 40. The transmitted channels travel to the first coupler along the second waveguide 38B. The first coupler directs the channels transmitted on both the first waveguide 38A and the second waveguide 38B onto the drop waveguide 24. As a result, the filter 12 directs channels having wavelengths that are not associated with the gratings 40 from the add waveguide 16 to the drop waveguide 24.

The gratings 40 are constructed to achieve a particular output profile for the channels directed to the drop waveguide 24. For instance, when the desired output profile has three wavelength bands, the first waveguide and the second waveguide can each include three gratings 40. Each of the gratings 40 is constructed so as to be associated with a particular wavelength band of the desired output profile. For instance, each grating 40 is constructed so as to direct from to the second waveguide 38B channels having the wavelengths in one of the wavelength bands of the desired output profile. As a result, when the filter 12 is to be a periodic filter 12, the gratings 40 are constructed to direct channels having periodically spaced wavelength bands onto the second waveguide 38B.

The filters 12 shown in FIG. 6 and FIG. 7 can be tunable by tuning the performance of the gratings 40. The performance of a grating 40 is typically tuned by applying energy to the grating 40 so as to change the index of refraction of the waveguide adjacent to the grating 40. For instance, a grating 40 is often tuned by applying heat to all or a portion of the grating 40, passing a current through all or a portion of the grating 40, applying an electrical field across all or a portion of the grating 40 or applying a stress to all or a portion of the grating 40.

The gratings 40 can be tuned concurrently. For instance, the gratings 40 can be tuned so the pattern of wavelength bands and the gaps 30 between the wavelength bands does not substantially change during the tuning as is illustrated in FIG. 2A and FIG. 2B. Alternatively, the gratings 40 can be tuned independently. Tuning the gratings 40 independently allows the wavelength bands to be shifted relative to one another. For instance, one wavelength band can be shifted while the other wavelength bands do not shift. As a result, the gap 30 between the shifted wavelength band and the adjacent wavelength bands changes. Independent tuning of the gratings 40 can reduce the power required to tune the filter 12 because a single bandwidth is shifted. Further, independent tuning can provide added flexibility in the number and combinations of channels that are filtered.

The filter 12 employed as the first filter 12A need not be the same as the filter 12 employed as the second filter 12B. As noted above, the add waveguide 16 is optional for use in the second filter 12B. Because the add capabilities are not required for the second filter 12B, the number of filters 12 that are suitable for use as the second filter 12B is expanded.

Although the above principles are disclosed in the context of an add/drop node 10, the add/drop node 10 can be employed only to drop channels by not employing the add waveguide 16 or by employing a first filter 12A without add capabilities. Additionally, the add/drop node 10 can be employed only to add channels by not employing the drop waveguide 24 or by employing a first filter 12A without drop capabilities. Additionally, the add/drop node 10 employed above can be serve as a filter 12 by not employing the add waveguide 16 and the through waveguide or by constructing the add/drop node 10 without the add waveguide 16 and the through waveguide. Alternatively, first filter 12As and second filter 12Bs that do not have add and/or drop capabilities can be employed. Examples of filters 12 without add and/or drop capabilities are disclosed in U.S. patent application Ser. No. 09/872472; filed on Jun. 1, 2001; entitled "Tunable Optical Filter."

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. An add/drop node, comprising:
    a first filter configured to receive a first light beam having a plurality of channels and to direct channels having wavelengths falling within a plurality of first wavelength bands to a transition waveguide and channels falling outside of the first wavelength bands to an output waveguide; and
    a second filter configured to receive the channels directed to the transition waveguide and being configured to direct channels having wavelengths falling within a plurality of second wavelength bands to a drop waveguide and channels falling outside of the second wavelength bands to the output waveguide.

2. The node of claim 1, wherein the first filter is configured to receive a second light beam having one or more channels on an add waveguide and to direct channels that do not have wavelengths falling within the plurality of first wavelength bands from the add waveguide to the drop waveguide.

3. The node of claim 1, wherein the first filter is a tunable filter.

4. The node of claim 1, wherein the second filter is a tunable filter.

5. The node of claim 1, wherein the first filter and the second filter are constructed such that a pattern of the first wavelength bands is different from a pattern of the second wavelength bands.

6. The node of claim 5, wherein the first filter and the second filter are periodic filters and the period of the first filter is different from the period of the second filter.

7. The node of claim 5, wherein the first filter and the second filter are periodic filters and the period of the first wavelength bands is different from the period of the second wavelength bands.

8. The node of claim 1, wherein the first filter includes a plurality of gratings.

9. The node of claim 1, wherein the second filter includes a plurality of gratings.

10. The node of claim 1, wherein the output waveguide receives channels from a first pass waveguide and from a second pass waveguide, the first filter being configured to direct the channels falling outside the plurality of first wavelength bands to the first pass waveguide and the second filter being configured to direct the channels falling outside the plurality of second wavelength bands to the second pass waveguide.

11. The node of claim 10, wherein the second filter is configured to direct channels that do not have wavelengths falling within the plurality of second wavelength bands to the output waveguide.

12. The node of claim 1, wherein the first filter is configured to receive a second light beam having one or more channels on an add waveguide and to direct channels having wavelengths falling within the plurality of first wavelength bands from the add waveguide to a pass waveguide.

13. A method of operating an add/drop node, comprising:
    selecting a target wavelength to be dropped by an add/drop node having a first filter in optical communication with a second filter, the first filter being configured to direct channels having wavelengths falling within a plurality of first wavelength bands from an input waveguide to the second filter and channels falling outside of the first wavelength bands to an output waveguide, the second filter configured to direct channels having wavelengths falling within a plurality of second wavelength bands to a drop waveguide and channels falling outside of the second wavelength bands to the output waveguide; and
    tuning the first filter such that a first wavelength band includes the target wavelength.

14. The method of claim 13, further comprising:
    tuning the second filter such that a second wavelength band includes the target wavelength.

15. The method of claim 13, wherein the second filter is not tunable.

16. A method of operating an add/drop node, comprising:
    selecting a target wavelength to be dropped by an add/drop node having a first filter in optical communication with a second filter, the first filter being configured to direct channels having wavelengths falling within a plurality of first wavelength bands from an input waveguide to the second filter and channels falling outside of the first wavelength bands to an output waveguide, the second filter configured to direct channels having wavelengths falling within a plurality of second wavelength bands to a drop waveguide and channels falling outside of the second wavelength bands to the output waveguide; and tuning the second filter such that a second wavelength band includes the target wavelength.

17. A method of operating an add/drop node, comprising:

selecting a target wavelength to be added by an add/drop node having a first filter in optical communication with a second filter, the first filter being configured to direct channels having wavelengths falling within a plurality of first wavelength bands from an add waveguide to an output waveguide and to direct channels having wavelengths falling outside of the first wavelength bands from the add waveguide to the second filter, the second filter configured to direct channels having wavelengths falling within a plurality of second wavelength bands to a drop waveguide and channels falling outside of the second wavelength bands to the output waveguide; and tuning the first filter such that a first wavelength band includes the target wavelength.

\* \* \* \* \*